United States Patent

Garland et al.

[11] Patent Number: 5,600,835
[45] Date of Patent: Feb. 4, 1997

[54] ADAPTIVE NON-LITERAL TEXT STRING RETRIEVAL

[75] Inventors: Harry T. Garland, Los Gatos; Kenneth M. Hunter, San Francisco; Michael G. Roberts; Hadar I. Avi-Itzhak, both of Mountain View, all of Calif.

[73] Assignee: Canon Inc., Tokyo, Japan

[21] Appl. No.: 561,204

[22] Filed: Nov. 20, 1995

Related U.S. Application Data

[63] Continuation of Ser. No. 110,093, Aug. 20, 1993, abandoned.

[51] Int. Cl.$^6$ ............................ G06F 17/30; G06F 17/28
[52] U.S. Cl. ......................................... 395/605; 364/226.4
[58] Field of Search ............................ 395/600; 364/200, 364/419

[56] References Cited

U.S. PATENT DOCUMENTS

| | | | |
|---|---|---|---|
| 4,453,217 | 6/1984 | Boivie | 364/300 |
| 5,008,818 | 4/1991 | Bocast | 364/200 |
| 5,099,425 | 3/1992 | Kanno; Yuji et al. | 364/419 |

FOREIGN PATENT DOCUMENTS

| | | | |
|---|---|---|---|
| 0271664A2 | 6/1988 | European Pat. Off. | G06F 15/40 |

OTHER PUBLICATIONS

J. E. Hopcroft and J. D. Ullman, "Introduction To Automata Theory, Languages, And Computation", Addison–Wesley Publishing Company, 1979.

Brunner and Korfhage, "An Automatic Improvement Processor For An Information Retrieval System," *Proc. 2nd International Conference on Expert Database Systems*, ed. by L. Kerschberg, Apr. 1988, pp. 449–468.

Feldman and Shapiro, "Spatial Machines: A More Realistic Approach to Parallel Computation", *Communications of the ACM*, vol. 35, No. 10, Oct. 1992, U.S.A., pp. 61–73.

Hopcroft and Ullman, "Finite Automata and Regular Expressions," *Introduction To Automata Theory, Languages, and Computation*, Addison–Wesley Publishing Company, U.S.A., 1979, pp. 13–29.

Kharin, "Context–Morphological Method of Iterative Search for Textual Information", 11444 *Automatic Documentation & Mathematic Linguistics*, vol. 25, 1991, pp. 13–19, Seriya 2, No. 6, New York, New York.

Kobayashi, Imamura, Takahashi, Kubota, Kanaoka, Hamamoto, and Tomita, "A Searching Method of the Most Similar String in The File of a Document Retrieval System", 8169 *Systems and Computers in Japan*, vol. 23, No. 2, 1992, New York, New York, pp. 24–38.

(List continued on next page.)

*Primary Examiner*—Thomas G. Black
*Assistant Examiner*—Cheryl Renea Lewis
*Attorney, Agent, or Firm*—Elizabeth F. Enayati; Edward J. Radlo

[57] ABSTRACT

Method and system for selectively retrieving information contained in a stored document set using a non-literal, or "fuzzy", search strategy. A text string query is transmitted (200) to a computer processor, and a dissimilarity value $D_i$ is assigned (208) to selected ones of stored text strings representative of information contained in a stored document set, based upon a first set of rules (106). A set of retrieved text strings representative of stored information and related to the text string query is generated (212), based upon a second set of rules (107). Each of the retrieved text strings has an associated dissimilarity value $D_i$, which is a function of at least one rule $R_n$ from the first set of rules (106) used to retrieve the text string and a weight value $w_n$ associated with that rule $R_n$. The retrieved text strings are displayed (216) preferably in an order based on their associated dissimilarity value $D_i$. Once one or more of the retrieved text strings is chosen, the weight value $w_n$ associated with at least one rule of the first set of rules (106) is adjusted (220) and stored.

16 Claims, 4 Drawing Sheets

OTHER PUBLICATIONS

Wu, Sun, et al., "Fast Text Searching Allowing Errors", Communications of the ACM, Oct. 1992, vol. 35, No. 10, pp. 83–91.

Baeza–Yates, Ricardo, et al., "A New Approach to Text Searching", Communications of the ACM, Oct. 1992, vol. 35, No. 10, pp. 74–82.

Manber, Udi, et al., "Approximate String Matching with Arbitrary Costs for Text and Hypertext", Department of Computer Science, University of Arizona, Feb. 1990.

Schek, H. J., "Tolerating Fuzziness in Keywords by Similarity Searches", Kybernetes, 1977, vol. 6, pp. 175–184.

ADAPTIVE NON-LITERAL TEXT STRING RETRIEVAL

This is a continuation of U.S. patent application Ser. No. 08/110,093, filed on Aug. 20, 1993, and now abandoned. Another related application is U.S. patent application Ser. No. 08/330,968, filed on Oct. 28, 1994, which application is a continuation-in-part of U.S. patent application Ser. No. 08/110,093, now abandoned.

BACKGROUND OF THE INVENTION

1. Field of the Invention

The present invention relates generally to the field of document storage and retrieval systems of the type used for multiple document manipulation. Specifically, the invention relates to a method and system for selectively searching and retrieving information from stored documents using a non-literal search strategy.

2. Brief Description of Background Art

Electronic storage of documents has facilitated the handling of large volumes of documents, such as those handled by hospitals, universities, government institutions, and the like. Typically, the documents are entered into massive storage systems by use of a scanner system that converts text into electronic data. Documents primarily containing text can readily be scanned and stored in various electronic forms in this manner. Selective retrieval of information from the stored document set poses significant problems due to the volume of information to be searched.

Typical existing systems assign an index to each document as it is entered into storage. The index may be a system-generated or a user-defined code associated with each document. The code then is stored together with the document. To retrieve a document, a user must enter the appropriate code associated with the desired document. Other systems use key words extracted from the document which the user may then use to retrieve a document. The problem encountered with such systems is that a user may retrieve only entire documents, and must know the index, code, or key words associated with a desired document.

Other systems permit users to access selected information from a document set by entering a search term into the system. The system then reads through the entire document set to find an exact match for the entered search term. However, in some instances there may be a mismatch between the search term and the term in the document set. For example, a user may enter a wrong or unintended search term, such as by making a keyboarding or other error when entering the search term. As another example, there may be an error in the original text, OCR, or manually entered key word. Existing systems that search for exact matches are incapable of handling such errors in entering search terms, and would be unable to retrieve a desired document.

A non-literal, or "fuzzy", search involves entering a text string into a computer system and then searching for a "close" match of that text string in a stored text file. For example, a user may request a search on "recieve" (spelled incorrectly), and the system may find the correctly spelled word "receive". In another example, if the stored text file is obtained from optical character recognition (OCR) of an optically scanned document, often the OCR system misrecognizes characters that are typographically similar. The letter "O" may be misrecognized as the numeral "0", or the letter pair "rn" may be misrecognized as the single letter "m". In these instances, it would be desirable to retrieve text that is typographically close to the input text string.

In prior art systems, once a user types in a search term, one or more "matches" are found in the target document set and presented to the user for selection. The "best" match term, as ultimately determined by which of the match terms are selected by the user, may be buried among a list of possible matches or may be at the top of the list. Typically, the order of displayed retrieved terms is based on criteria that are not user-dependent. However, if the same user is using a system for retrieving documents, and that user consistently makes the same keyboarding or other errors in entering a search request, or, if consistent errors occur in stored text, such as OCR errors, it would be advantageous to have an adaptive prediction of the "best" match, as based on past selections, automatically appear at or near the top of the selection list. Existing systems do not incorporate such an adaptive feature.

Thus, there remains a need for a method and system for selectively retrieving information from a document set based on an adaptive non-literal search strategy.

SUMMARY OF THE INVENTION

The present invention is a method and system for selectively retrieving information contained in a stored document set using an adaptive non-literal, or "fuzzy", search strategy.

The system includes a data input device (104) for transmitting a user-defined text string query to a processor (102). A first storage medium (106) stores a first set of rules, each rule $R_n$ in that set having an associated weight value $w_n$, and a second storage medium (107) stores a second set of rules. The system considers (202) a first text string (TS) in the stored document set. A dissimilarity value $D_i$ is computed as a function of the first set of rules and the weight value $w_n$ associated with each rule in that set of rules. A retrieved text string set is generated (212), including a plurality of document text strings, in accordance with the text string query and at least one rule from the second set of rules.

The system orders (214) the retrieved text strings in the text string set, based on the dissimilarity values $D_i$, and then displays (216) the ordered set using a display device (110). One of the displayed retrieved text strings may then be selected by a user for further processing or document retrieval. That selected text string has an associated rule, or plurality of rules, each rule having an associated weight value $w_n$. The weight value $w_n$ associated with each rule of the selected text string is adjusted (220) by some value, to define an adjusted weight value $w_n'$ that is stored for subsequent use.

The present invention further includes a method incorporating the functions of the described system. The invention is further described in the following detailed description and figures.

DETAILED DESCRIPTION OF THE PREFERRED EMBODIMENTS

The present invention relates to retrieving words or other information from a document set or other data set stored on a computer. A user may wish to retrieve a document, or a portion of a document, based on a search term. However, for a variety of reasons, there may be a mismatch between the search term entered by the user and the desired corresponding text string in a document set. The present system and method enable retrieval of a variety of "close" text strings from a document set based on the entered search term, and display of the retrieved text strings in an order that reflects an adaptive aspect of the system.

One problem in designing such non-literal, or "fuzzy" search systems, is in defining how "close" a word in the document set must be for it to be considered a match with the search term. The present invention addresses that problem by recognizing a set of rules that govern most types of errors in entering a search term. For example, a user may want to search on the term "monkey", but may enter the term "mankey" or even "makney". Such errors represent application of a single rule in the first instance, and two rules in the second instance. However, the present invention likely retrieves the word "monkey" and displays the word in a displayed list of retrieved terms.

Figure 1:
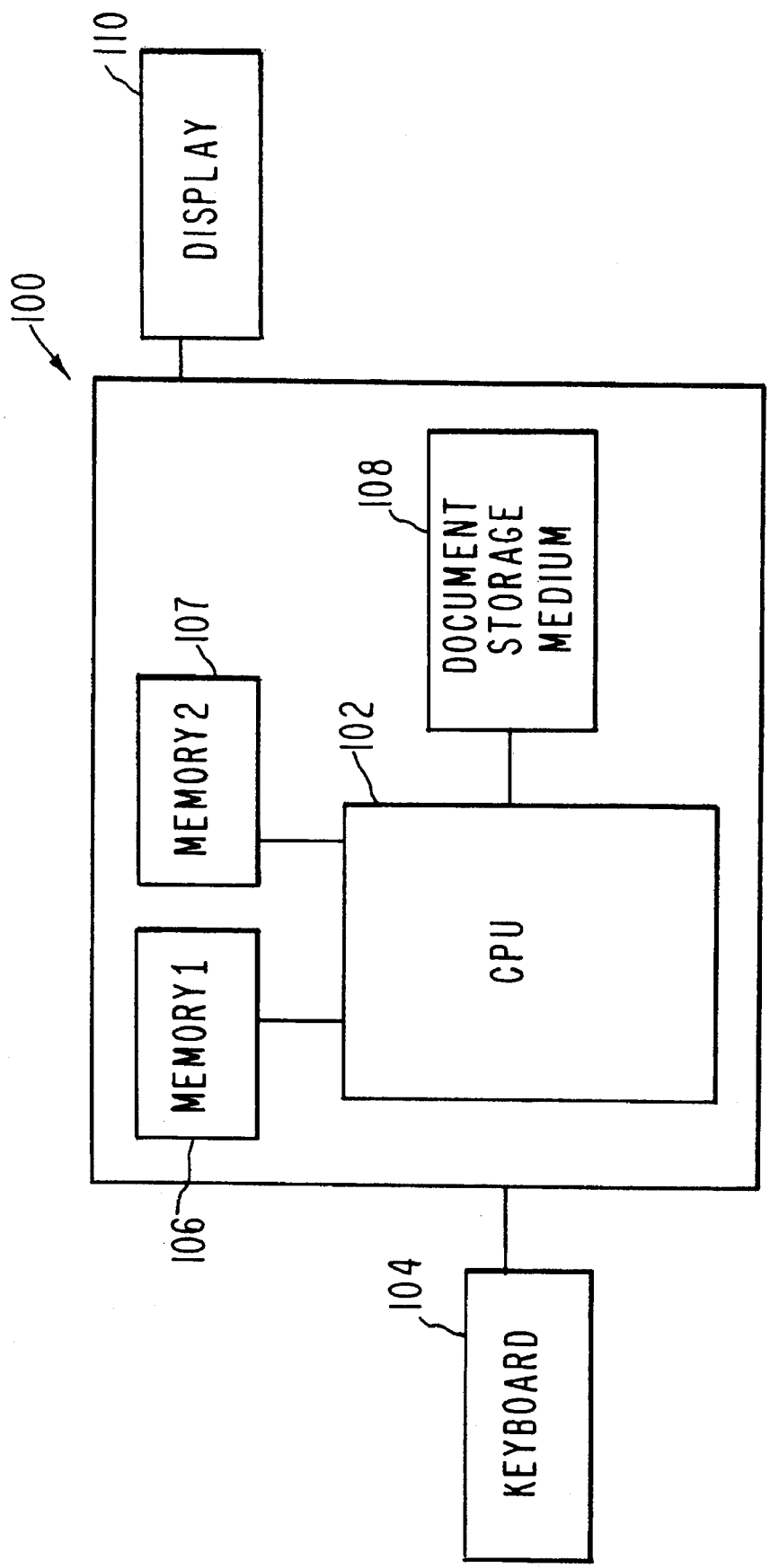
FIG. 1 shows a block diagram of an embodiment of the present invention.

Turning to FIG. 1, the present system 100 includes a computer processor 102 that is in communication with an input device 104, such as a keyboard, at least one memory device 106, and an output display device 110. The processor 102 also is in communication with a storage medium 108 containing a stored document set. The storage medium 108 may be used to store information contained in a document set that is typed, scanned, entered using optical character recognition technology, or entered using any technology known and available to those skilled in the art of document storage.

In a preferred embodiment of the present system, the storage medium 108 and the processor 102 are contained within a single housing, forming a self-contained system. In alternative embodiments, the storage medium 108 may be located in a remote location, accessible by the processor 102 via a network, cables, or other medium of transferring information.

Figure 2A:
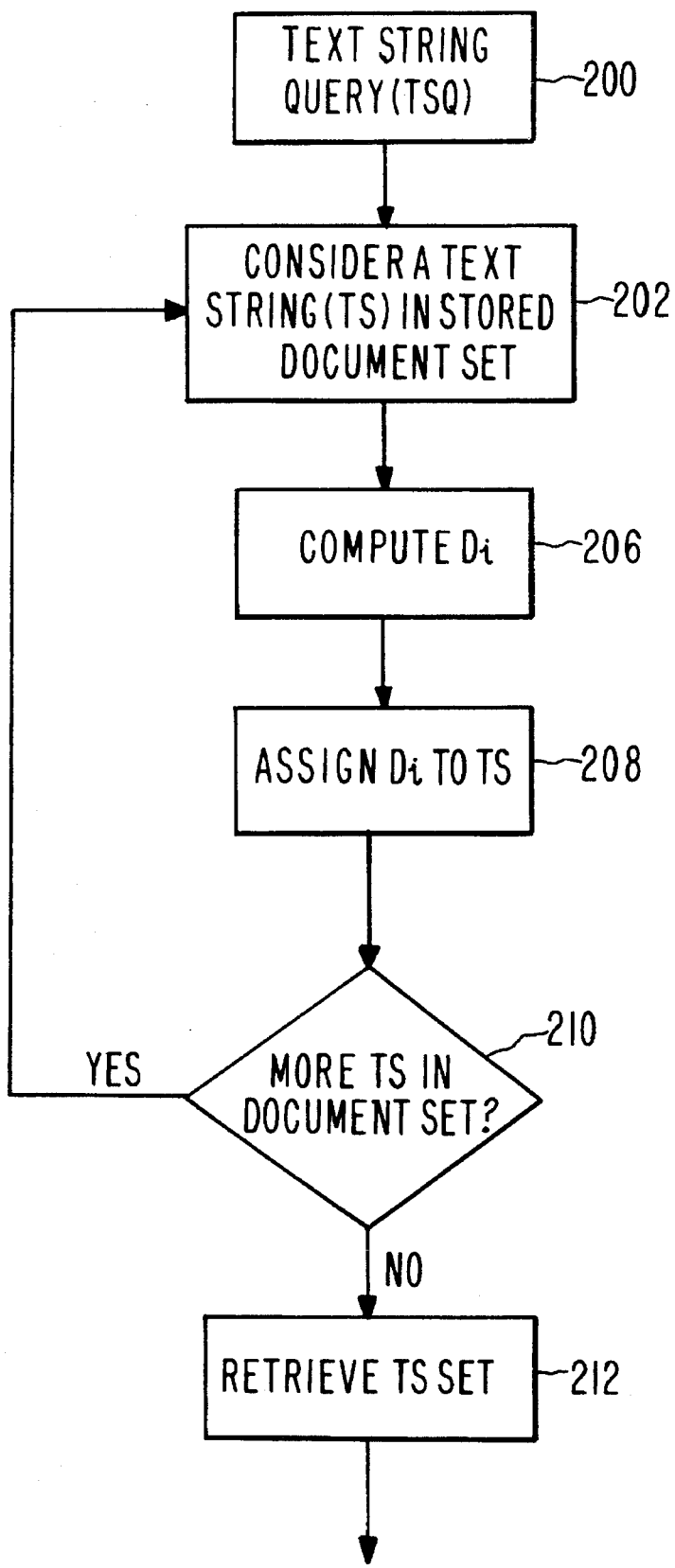
FIGS. 2A–2B depict a flow chart of the present invention.
Figure 2B:
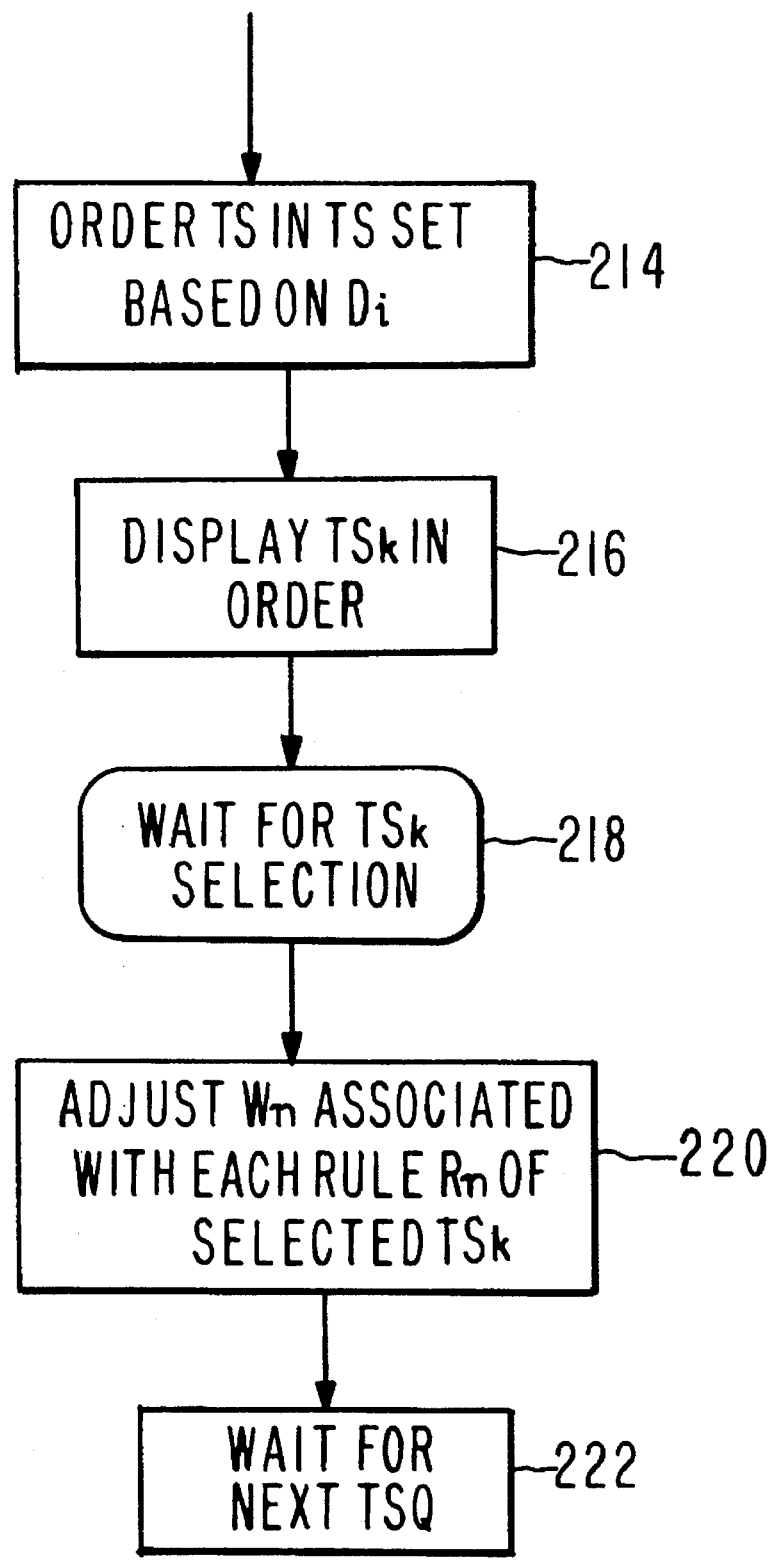

FIGS. 2A–2B show a functional block diagram of the present system 100. The processor 102 receives a text string query (TSQ) 200 from the input device 104. The query may include a search term, phrase, or any other series of characters or single characters which a user requests from the document set stored in the document storage medium 108. The system 100 next considers 202 a first text string in the stored document set. The first text string considered 202 may either be the first text string in the stored document set, or may be any one of the text strings in the stored document set designated as a "first" text string for purposes of the present system.

A dissimilarity value $D_i$ next is determined 206 and then assigned 208 to the document text string considered at step 202. There are several methods known and available to those skilled in the art for determining a dissimilarity value $D_i$. Thus, any method for determining a dissimilarity value $D_i$ may be incorporated into the inventive system.

In a preferred embodiment, the dissimilarity value $D_i$ is defined as:

$$D_i = \sum_{1}^{k} r_n w_n$$

wherein $r_n$ is the number of times a particular rule $R_n$ from the first set of rules stored in memory 106 must be applied to the document text string to create a text string that matches the pattern specified by the text string query, k is the number of rules, and $w_n$ is the weight assigned to each rule.

The first set of rules stored in memory 106 is a set of manipulations that may be considered in the aggregate to modify the document text string such that the document text string matches the pattern specified by the text string query. Exemplary manipulations may include extra character, missing character, wrong character, exchanged adjacent characters, wrong case character/case sensitive, wrong case character/case insensitive, extra or missing prefix, suffix, or root characters. There are many additional rules that may exist and that may be used, including variations of these defined rules. These exemplary manipulations may be defined as follows:

"Extra character" means that the document text string includes an extra character that is not part of the text string query. For example, while the query is for the word "misuse", the document text string is the term "missuse". In that example, a single extra character "s" is included in the document text string that does not appear in the query.

"Missing character" means that a character that is part of the text string query is omitted from the document text string. For example, while the query is for the word "conscious", the document text string is "consious", or "concious".

"Wrong character" means that a character that is part of the document text string is used in place of a desired character. For example, while the query is for the word "bounce", the document text string is "bounse", "bownce", and the like. In each of those examples, a non-matching presumably has been substituted for a matching letter.

"Exchanged adjacent characters" means that adjacent characters in a document text string are exchanged. For example, while the query is for the word "receive", the document text string is "recieve".

"Wrong case character/case sensitive" means that, in a case-sensitive search, the document text string includes a mismatched case character. For example, while the text string query is "America", the document text string is "america", without the initial capital "A".

"Wrong case character/case insensitive" means that, in a search where the case of the characters is relatively unimportant, the document text string includes a character having a case that does not match its counterpart in the text string query. For example, a document text string appears in all capital letters even though the search is case insensitive and the text string query may or may not include capital letters.

Variations on case sensitivity include case sensitive/insensitive for every letter in a word, case sensitive only for the initial letter (as in the example above), and case insensitive only for the initial letter but case sensitive for every other letter in a word. Case sensitivity also may depend on location with respect to stems, roots, prefixes, and suffixes.

"Extra or missing prefix, suffix, or root characters" means, for example, that extra characters occur at one end or the other of a document text string. For example, while the text string query is for the word "exist", and where "preexist" is found, this is the closest match, even though it has extra characters forming a prefix "pre".

Each of the rules defined above maybe a single rule, or may represent a class of rules that address the same problem. For example, the rule "wrong character" may be a set of rules having one rule that assigns a penalty associated with the character "l" instead of the numeral "1", another rule that assigns a penalty associated with the character "o" instead of the numeral "0", and the like for OCR text. The set of rules $R_n$ are not necessarily exclusive, in the sense that "bounce" also can be obtained from "bounse" by the application of both the extra character rule, to yield "boune", and the missing character rule, to yield the target "bounce".

Other types of manipulations and search strategies that may be included as rules in the present system may include heuristic rules such as a thesaurus rule in which related words are found in a search, a phonetic rule in which phonetically equivalent words are found in a search, a language translation rule, and a prefix/suffix removal rule that finds all words having the same root. Other rules known to those skilled in the art may be included in the rule set and are anticipated as being included in the rule set of the present system.

The next step 210 is a check whether there are additional text strings in the document set to be considered. This loop of steps 202–210 continues, as shown in FIG. 2A, until each of the text strings in the document set has been assigned a dissimilarity value $D_i$.

In one embodiment, a concordance table or other index may be included in the system. In that embodiment, the concordance table points to selected text strings in the document set such that not all text strings are assigned a dissimilarity value $D_i$.

The weight value $w_n$ associated with each rule initially may be some predetermined number. In one embodiment, all rules are given the same initial weight, and in another embodiment each rule is given a weight based on some expected weight. In one embodiment, the weight value $w_n$ is some measure of the likelihood that the rule $R_n$ will generate a text match that will be selected by the user. Preferably, the weight value $w_n$ is a penalty value associated with each rule $R_n$.

The weight values $w_n$ may be user-specific or application-specific. For example, if a particular user is known to make typographic substitution errors in entering a search query, the initial weight associated with that rule will reflect that tendency. For another example, in a document set that was obtained using OCR technology and stored in memory, a common mismatch may arise from the substitution of the numeral "1" for the letter "l", and vice versa. The weight values $w_n$ for such a common error initially may be set at some predetermined value based on historical data for the application of the character substitution rule for those OCR situations. In an alternative embodiment of the present invention, different rules may have the same weight value. The weight value also may be adjustable or determinable by the user. The weight associated with each rule is important for displaying the search result, as described in further detail below.

In the preferred system, the weight value $w_n$ is a penalty attributed to each rule. Each penalty may be attributed with an initial value, a range, that may be based on the values of the weight of another rule or weights of a plurality of rules, plus various parameters to govern the manner and rate of adaptive change. As described above, the penalty may be set to the same value for each rule or may be set to different values based on prior experience or projections of the relative importance of each rule.

Once all document text strings are assigned 208 a dissimilarity value $D_i$, the next step 212 is retrieving a text string set. The system retrieves a text string set in accordance with a second set of rules stored in a memory device, such as device 107 of FIG. 1. These rules may include: retrieve the first x number of document text strings having the lowest dissimilarity value $D_i$; display only those document text strings having a dissimilarity value below x; display only those text document strings having a dissimilarity value of zero (i.e., exact matches); display all document text strings having the lowest dissimilarity value $D_i$; display all document text strings having the j lowest dissimilarity values $D_i$; display one document text string having the lowest dissimilarity value $D_i$ per document; and the like. In one embodiment, the second set of rules may affect the $D_i$ values. For example, each document may have an associated penalty weight that is used to affect the $D_i$ values of all document text strings obtained from that document. The document weights may be fixed, or may be determined from user selections of retrieved text strings.

In a preferred embodiment, the retrieved text strings then are ordered 214 based on the dissimilarity value $D_i$ associated with each of the text strings in the retrieved text string set. Preferably, the retrieved text string having the lowest dissimilarity value is prioritized over a text string having a higher dissimilarity value. For example, a single retrieved text string may appear several times, if it occurs in different documents, depending on the rule from the second set of rules used to retrieve the text string from the document text strings.

At step 216 the display device 110 displays the ordered retrieved text string set. The generated display typically is for the user to view the retrieved text string prior to retrieving an entire page or a portion of a page of the document set containing the retrieved text string. For example, in a medical records context, a user may wish to retrieve and view the stored medical record of a certain patient "Smith". Before retrieving the entire medical record for each patient named "Smith", and other variations on the name "Smith", the present system displays 216 a list of retrieved text strings located in the search.

The system waits 218 for the selection of a text string from the display 110. This selection may be made by a user through the input device 104, which may include a keyboard, mouse, or touch screen. Such a selection results in instructions being sent to another system that retrieves a portion of the document, which may include several pages, a single page, or a portion of a page, containing the selected text string. An exemplary system that may be used in conjunction with the present system is disclosed in commonly owned U.S. patent application Ser. No. 08/060,429, which is incorporated herein by reference.

In another example, the selected text string may be sent to a processor for interaction with an application program to achieve a spellcheck operation. Specifically, once the user activates a spellcheck program incorporating the present invention, the system identifies a text string in the document being spellchecked and searches through a dictionary, i.e., the document set, to identify a match. The "best" matches are then displayed for a user in the manner substantially as described herein. The present invention may also be used in a variety of other systems, including foreign language look-up, practice, citation, and dictionary systems, and the like.

An important aspect of the present invention is that the weight values $w_n$ are adaptive in nature. Accordingly, the next step 220 involves adjusting the weight value $w_n$ associated with each rule, or rules, associated with the retrieved text string $TS_k$ selected from the display. For example, in one embodiment, if a user selects one of the displayed text strings $TS_k$, the penalty weight associated with each of the rules that were invoked at steps 204–206 may be decremented or otherwise adjusted. As the system continues to be used, the weight associated with each rule $R_n$ of the selected text string is nudged up or down in such a manner that the system adapts to both the user and the application environment. This may be achieved by effectively "rewarding" rules that are successful in finding close matches that ultimately are selected by the user, e.g., by decreasing their associated penalty weights, to achieve a basis for discriminating among the rules based on an adjustment of the weight values.

In a preferred embodiment, the weight values $w_n$ associated with every rule $R_n$ of the rule set are adjusted. In other embodiments, only the weight value $w_n$ associated with the rules $R_n$ used in retrieving the selected text string $TS_k$ are adjusted. In yet another embodiment, the weight values $w_n$ associated with selected ones of the rules $R_n$ are adjusted. The specific manner in which the weight values $w_n$ are adjusted depends on the particular embodiment of the invention. Preferably, the system retains the adjusted weight values in memory so that for each subsequent search the adjusted weight values are applied in accordance with the use of their respective rules. Thus, at the step 208 of assigning a dissimilarity value $D_i$ to each text string in a document set, that value $D_i$ is determined based on the adjusted weight values from previous searches.

The objective of the adjustment of weight values is to arrive at new weights $w_n$ in such a manner as to discriminate between the text matches that the user selects and those which the user does not select. A preferred method, referred to as a perturbation method, determines and uses a measure of correspondence C to adjust the weights $w_n$ of all the rules in the first set of rules. According to the perturbation method, the weights associated with each of the various rules $R_n$ may either be incremented or decremented in such a way as to increase C. The measure of correspondence C determined in practicing the present invention may be expressed as:

$$C = \bar{D}_m - \bar{D}_i$$

wherein $\bar{D}_m$ is the mean dissimilarity value associated with non-selected text strings m, and $\bar{D}_i$ is the mean dissimilarity value of selected text strings. Recall that, typically, each text string in the document set has an associated dissimilarity value.

Figure 3:
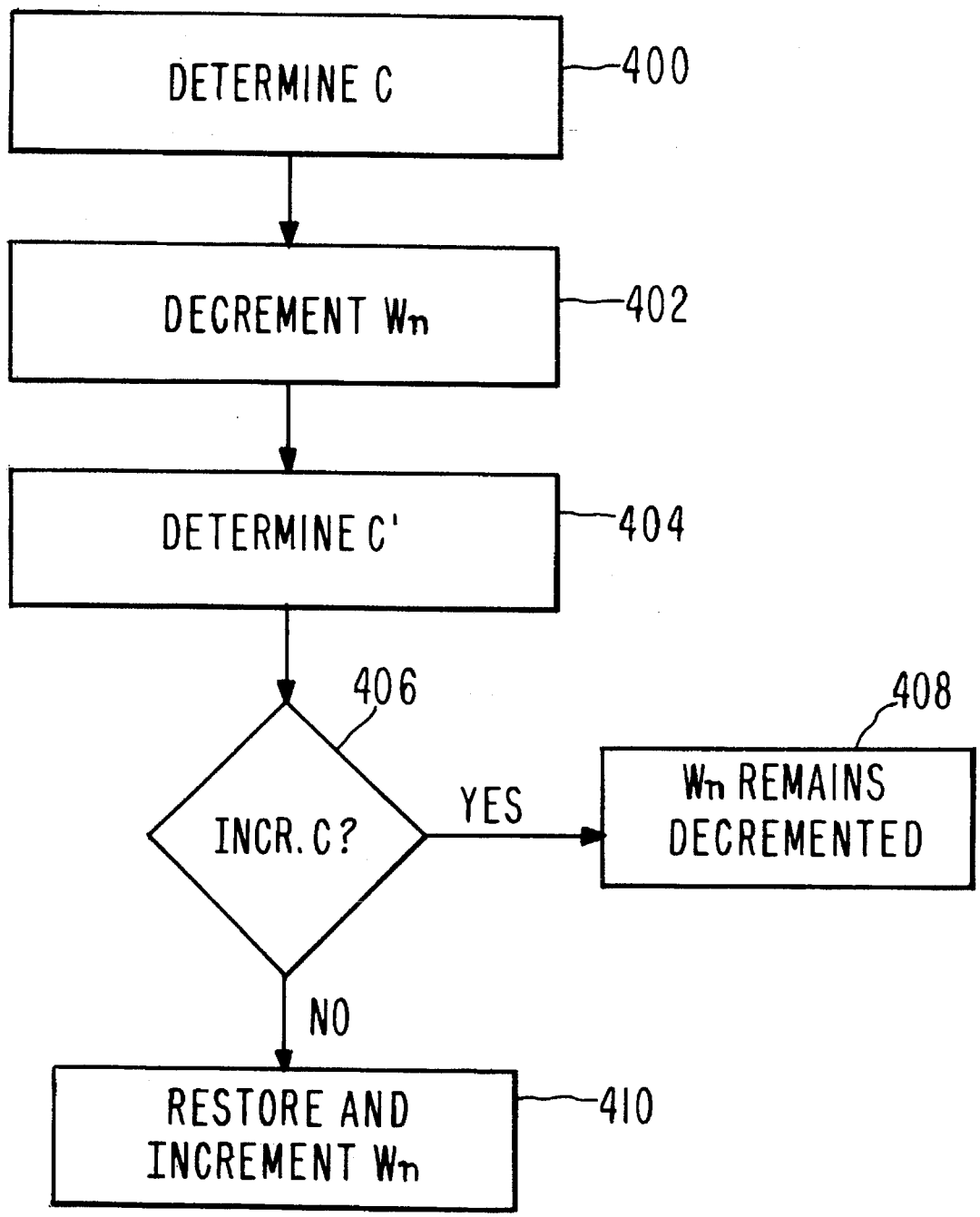
FIG. 3 depicts a flow chart of one embodiment of the present invention relating to determining a measure of association.

FIG. 3 is a flow chart of a preferred system for performing the perturbation method. As a first step 400 an initial measure of association C is determined, preferably in accordance with the algorithm stated above. This first step typically is taken after the user has made one or more selections from the set of retrieved text strings. In the next step 402 the weight $w_n$ associated with a single rule $R_n$ is decremented by a predetermined value. The value may be a constant, such as 1, or may be any selected number. The method of performing the decrement may be by subtraction, division, or other mathematical methods known and available to those skilled in the art. All other weights remain unchanged for purposes of performing this method. An adjusted measure of association C' is determined 404 using the decremented weight value $w_n'$. In the preferred embodiment, this determination 404 is made in accordance with the algorithm defined above.

In the next step 406 the system checks whether the adjusted measure of association C' determined in step 404 has increased over the initial measure of association C determined in step 400 prior to the decrementing step 402. If C' is increased over C, then the weight value $w_n'$ remains 408 the decremented value. However, if C' is not increased over C, then the weight value $w_n'$ is returned to its original value $w_n$, and then $w_n$ is incremented 410 by some predetermined value. The steps of 400 through 410 may be performed individually for the weight associated with each rule in the present system. The method of performing the increment may be by addition, multiplication, or other mathematical methods known and available to those skilled in the art.

Optionally, the measure of association C may be recalculated after step 410 or otherwise checked against C to verify an improvement. The illustrated system of FIG. 3 may alternatively be performed by initially incrementing the weight value $w_n$, and/or by checking for a decrease in C rather than an increase in C. The perturbation method is performed to increase the measure of correspondence. In practicing the invention including performing perturbation on the weights and rules, the system strives to achieve as much separation between the dissimilarity value $D_i$ of selected text strings and the non-selected text strings. Other methods of determining C may be used.

The system may further include some selection preference value $s_q$ associated with each text string. The selection preference value $s_q$ may be a binary number designating whether or not a particular text string TS has been selected. In a preferred embodiment, the selection preference variable $s_q$ is assigned a value of 0 if the match is selected by the user, and 1 if it is not selected by the user. Alternatively, the user may prioritize the retrieved text strings, assigning numeric values (not restricted to 0 or 1) to indicate preferences among the close matches. In that embodiment, a lower numeric value indicates a greater interest in a particular close match (e.g., 1 indicates first choice, 2 indicates second choice, etc.)

In alternative embodiments, an appropriate measure of correspondence C may be determined in any of several ways as: the Pearson product moment coefficient of correlation between the dissimilarity values $D_i$ and the selection preferences $s_q$; the reciprocal of the probability of the Pearson product moment coefficient of correlation computed under the null hypothesis that there is no correlation between the distances and the selection preferences; negative one multiplied by the probability of the Pearson product moment coefficient of correlation computed under the null hypothesis that there is no correlation between the distances and the selection preferences; the Spearman rho rank-order coefficient of correlation between the dissimilarity values $D_i$ and the selection preferences $s_q$; or, the reciprocal of the probability of the Spearman rho rank-order coefficient of correlation computed under the null hypothesis that there is no correlation between the dissimilarity value $D_i$ and the selection preferences $s_q$.

In one embodiment, after the weights $w_n$ have been restored and incremented at step 410 or decremented at step 408, the weights $w_n$ may be normalized. Normalization may be carried out to prevent the values of the weights from becoming too large or too small for precise calculation, and to ensure that dissimilarity values $D_i$ determined after separate queries have comparable values.

Normalization may be applied to the entire set of weights, or to subsets of weights corresponding to categories of related rules $R_n$. For example, weights associated with the substitution of typographically similar characters might constitute a subset of weights normalized separately from other weights.

Normalization may include one or more of the following steps: adding a quantity to the weight $w_n$ associated with each rule in a set to achieve a fixed mean or other measure of central tendency; multiplying the weight $w_n$ associated with each rule in a set by a quantity to achieve a fixed mean or other measure of central tendency, or to achieve a fixed standard deviation or other measure of dispersion; adding a quantity to the weight $w_n$ associated with each rule in a set in order to maintain a particular weight in the set at a fixed value; or, multiplying the weight $w_n$ associated with each rule in a set by a quantity in order to maintain a particular weight at a fixed value.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method for selectively retrieving text strings from a plurality of stored text strings contained in a document set stored on a data storage medium accessible by a computer processor, said method comprising the steps of:

A. transmitting a text string query defined by a user to the processor;

B. generating a dissimilarity value $D_i$ associated with the user-defined text string query and each of selected ones of the text strings in the stored document set in accordance with a first set of rules, wherein each dissimilarity value $D_i$ is a function of at least one rule $R_n$ from the first set of rules and a weight value $w_n$ associated with each $R_n$, wherein each weight value indicates the relative importance of the associated rule in predicting a desired outcome of the retrieval;

C. retrieving a text string set, including at least one retrieved text string, from the selected text strings in accordance with a second set of rules, based upon the dissimilarity values $D_i$ generated in step B;

D. generating a display of the retrieved text strings in a display order;

E. said user choosing at least one of the retrieved text strings from the displayed text string set for further processing; and F. automatically adjusting the weight value $w_n$, defining an adjusted weight value $w_n'$, associated with at least one rule of the first set of rules, based upon the results of the choosing step.

2. The method of claim 1, wherein, for subsequent retrievals, the dissimilarity value $D_i$ assigned to each selected text string uses the adjusted weight value $w_n'$.

3. The method of claim 1, wherein $$D_i = \sum_1^k r_n w_n$$

where $r_n$ is the number of times $R_n$ must be applied to the selected text string to create a test string that matches the text string query, and k is the total number of rules in the first set of rules.

4. The method of claim 3, wherein the step of generating a display comprises generating a display of the retrieved text strings in an increasing order based on the dissimilarity value $D_i$ associated with each retrieved text string.

5. The method of claim 3, wherein the step of adjusting the weight value comprises:

determining a measure of correspondence C between a mean dissimilarity value $\overline{D}_i$ associated with chosen text strings and a mean dissimilarity value $\overline{D}_m$ associated with non-chosen text strings.

6. The method of claim 5, further comprising increasing the measure C by selectively adjusting the weight values $w_n$ associated with selected ones of the rules in the first set of rules.

7. The method of claim 6, further comprising normalizing at least one of the weight values $w_n$.

8. The method of claim 1, wherein the step of adjusting the weight value $w_n$ comprises:

(a) decreasing the dissimilarity value associated with each of the chosen text strings; and (b) increasing the dissimilarity value associated with each of the non-chosen text strings.

9. A computer system for selectively retrieving text strings from a plurality of stored text strings contained in a document set stored on a data storage medium accessible by a computer processor, said system comprising:

A. data input means for transmitting a text string query defined by a user to the processor;

B. a first storage medium for storing a first set of rules, each rule having an associated weight value $w_n$, wherein each weight value indicates the relative importance of the associated rule in predicting a desired outcome of the retrieval, and a second storage medium for storing a second set of rules;

C. means for associating a dissimilarity value $D_i$ with each of selected ones of text strings from the data storage medium, wherein each dissimilarity value $D_i$ is a function of at least one rule $R_n$ from the first set of rules and the weight value $w_n$ associated with said $R_n$;

D. means for retrieving a text string set, including at least one text string, from the selected text strings, in accordance with the second set of rules, based upon the dissimilarity values $D_i$;

E. a display device for generating a display of the retrieved text strings in a display order;

F. choosing means for allowing said user to select at least one of the retrieved text strings for further processing; and G. coupled to the choosing means and responsive to said user's selection of said at least one retrieved text string for further processing, means for automatically adjusting at least one weight value $w_n$, defining an adjusted weight value $w_n'$.

10. The system of claim 9, wherein the dissimilarity value $D_i$ associated with each chosen text string includes the adjusted weight value $w_n'$.

11. The system of claim 9, wherein $$D_i = \sum_1^k r_n w_n$$

where $r_n$ is the number of times $R_n$ must be applied to the selected text strings to create a text string that matches the text string query, and k is the total number of rules in the first set of rules.

12. The system of claim 11, wherein the display device comprises means for displaying the retrieved text strings in an increasing order based on the dissimilarity value $D_i$ associated with each retrieved text string.

13. The system of claim 11, further comprising: means, associated with the first storage medium, for generating and storing a measure of correspondence C between a mean dissimilarity value $\overline{D}_i$ associated with chosen text strings and a mean dissimilarity value $\overline{D}_m$ associated with non-chosen text strings.

14. The system of claim 13, further comprising means for increasing the measure C by selectively adjusting at least one weight value $w_n$.

15. The system of claim 14, further comprising normalizing means for normalizing at least one weight value $w_n$.

16. The system of claim 9, wherein the adjusting means comprises:

(a) means for decreasing the dissimilarity value associated with each of the chosen text strings; and (b) means for increasing the dissimilarity value associated with each of the non-chosen text strings.

* * * * *